UNITED STATES PATENT OFFICE.

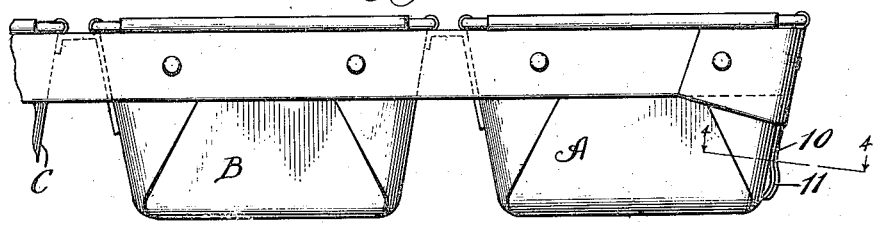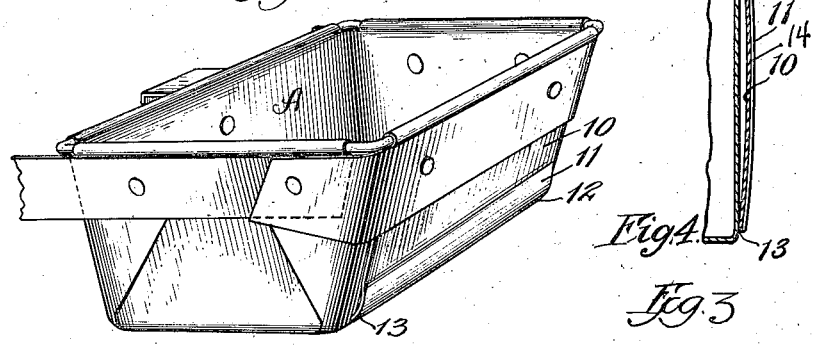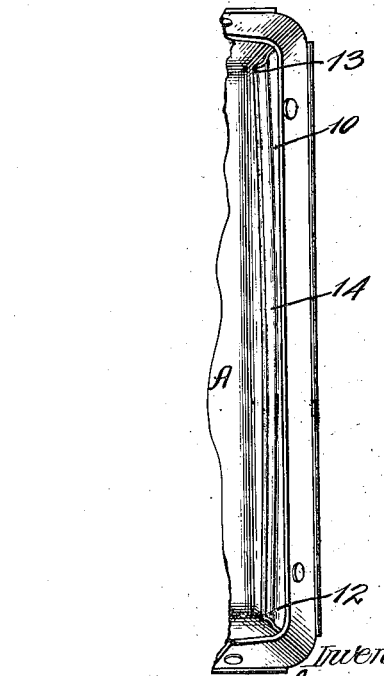

ALBERT COHN, OF CHICAGO, ILLINOIS, ASSIGNOR TO EDWARD KATZSINGER COMPANY, OF CHICAGO, ILLINOIS, A CORPORATION OF ILLINOIS.

BAKING-PAN.

1,149,730. Specification of Letters Patent. Patented Aug. 10, 1915.

Application filed August 22, 1913. Serial No. 786,059.

*To all whom it may concern:*

Be it known that I, ALBERT COHN, a citizen of the United States, residing at Chicago, in the county of Cook and State of Illinois, have invented certain new and useful Improvements in Baking-Pans, of which the following is a specification.

My invention relates to baking pans and has for its primary object the provision of an improved shield for baking pans.

With the above and other objects in view this invention consists substantially in the combination, arrangement and construction of parts all as hereinafter described, shown in the accompanying drawings, which form a part of this specification and show the preferred embodiment of my invention, and more specifically set forth in the subjoined claims.

In the drawings: Figure 1 is a side elevation of part of a series of baking pans constructed in accordance with the principles of this invention, the individual pans being shown in end elevation. Fig. 2 is a view in perspective of one of the end pans of the series. Fig. 3 is a bottom plan view of the outer side of the end pan shown in Fig. 2. Fig. 4 is a section taken on line 4—4 in Fig. 1 but on a slightly smaller scale.

In removing a series of baking pans from the oven a baker's peel is used and in practice the peel is applied with considerable force to the side of the end pan of the series, which ordinarily results in damage to the pan. Some means of protection is consequently necessary to preserve the side of the end pan from becoming misshapen. By the use of my invention the end pan of the series is guarded from injury.

The letter A indicates one of the end pans of a series of baking pans joined together, the other pans of the series being lettered B and C. Upon the outer side of the pan A exposed to the thrust of the baker's peel is secured a protection plate 10 of approximately the dimensions of the side of the pan and composed of a flat sheet of material relatively stiff as compared to the side of the pan. The plate 10 is provided at its bottom edge with a convex longitudinal bead 11. This bead 11 is in contact with the side of the pan at the ends of the bead, as at 12 and 13, and is bent outwardly or arched away from the side of the pan, as indicated at 14, (Figs. 3 and 4). It will thus be seen that while a certain cushioning effect is given to the protection plate 10 the force of the blow of the peel is communicated through the plate to the end pan at the lower corners of the outer side of the pan, which offers the resistance of the whole end of the pan to the force of the blow. In other words, the points at which the pan is best adapted to receive a blow are adjacent the lower corners of the outer side of the pan where both the bottom and end of the pan meet the side and form a strongly reinforced point upon the pan. At that joint adjacent each end of the pan the force of the blow of the peel is received.

In the accompanying drawings and in the foregoing description is set forth the preferred embodiment of my invention, but it is obvious that one skilled in the art may make modifications thereof without departing from the spirit of the invention.

I claim:

1. The combination with a baking pan, of a protecting plate disposed over the outer side of and substantially co-extensive with one side of said pan, the lower edge of said plate being arched outwardly from said side of the pan and the lower corners of the plate resting against corresponding portions of said side of the pan.

2. The combination with a baking pan, of a protecting plate disposed over the outer side of and substantially co-extensive with one side of said pan, there being an outwardly curved bead extending along the lower edge of said plate and said bead being outwardly arched over the side of the pan with the ends of said bead resting against the lower corners of said side of the pan.

In testimony whereof I have signed my name to this specification, in the presence of two subscribing witnesses, on this 19th day of August A. D. 1913.

ALBERT COHN.

Witnesses:
 HAROLD G. ROCKWELL,
 CHARLES H. SEEM.